(12) United States Patent
Jiang et al.

(10) Patent No.: US 12,192,962 B2
(45) Date of Patent: Jan. 7, 2025

(54) METHOD AND DEVICE IN NODES USED FOR WIRELESS COMMUNICATION

(71) Applicants: Qi Jiang, Shanghai (CN); Zheng Liu, Shanghai (CN); Xiaobo Zhang, Shanghai (CN)

(72) Inventors: Qi Jiang, Shanghai (CN); Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 520 days.

(21) Appl. No.: 17/575,644

(22) Filed: Jan. 14, 2022

(65) Prior Publication Data

US 2022/0225289 A1    Jul. 14, 2022

Related U.S. Application Data

(63) Continuation of application No. PCT/CN2020/099411, filed on Jun. 30, 2020.

(30) Foreign Application Priority Data

Jul. 15, 2019  (CN) .......................... 201910636223.X

(51) Int. Cl.
*H04W 72/02*     (2009.01)
*H04W 72/0446*   (2023.01)
(Continued)

(52) U.S. Cl.
CPC ....... *H04W 72/02* (2013.01); *H04W 72/0446* (2013.01); *H04W 72/0453* (2013.01); *H04W 72/1263* (2013.01); *H04W 92/18* (2013.01)

(58) Field of Classification Search
None
See application file for complete search history.

(56) References Cited

U.S. PATENT DOCUMENTS

| 12,058,678 B2 * | 8/2024 | Lee ........................ H04W 72/52 |
| 2018/0048994 A1 * | 2/2018 | Kwon ..................... H04W 4/08 |

(Continued)

FOREIGN PATENT DOCUMENTS

| CN | 107347215 A | 11/2017 |
| CN | 107645774 A | 1/2018 |

(Continued)

OTHER PUBLICATIONS

SR received in application No. PCT/CN2020/099411 dated Sep. 14, 2020.

(Continued)

*Primary Examiner* — Kodzovi Acolatse

(57) ABSTRACT

The present disclosure provides a method and a device in a node for wireless communications. A first node receives a first signaling, the first signaling being used to determine K time-frequency resource pools; and transmits a first signal in a first time-frequency resource set; the first time-frequency resource set belongs to a first time-frequency resource pool, the first time-frequency resource pool being one of the K time-frequency resource pools; K time offsets respectively correspond to the K time-frequency resource pools, and the first signaling is used to determine the K time offsets corresponding to the K time-frequency resource pools; a first time offset corresponds to the first time-frequency resource pool. The present disclosure designs a first signaling to flexibly configure time-domain resources used for sidelink transmission, thus avoiding interferences between cellular link and sidelink in a system larger transmission delay.

19 Claims, 6 Drawing Sheets

(51) Int. Cl.
*H04W 72/0453* (2023.01)
*H04W 72/1263* (2023.01)
*H04W 92/18* (2009.01)

(56) References Cited

U.S. PATENT DOCUMENTS

| | | | |
|---|---|---|---|
| 2018/0098322 A1* | 4/2018 | Yoon | H04W 56/0005 |
| 2019/0363851 A1* | 11/2019 | Lin | H04L 5/0051 |
| 2019/0373647 A1* | 12/2019 | Rugeland | H04W 72/0446 |
| 2020/0029318 A1* | 1/2020 | Guo | H04W 76/14 |
| 2020/0267597 A1* | 8/2020 | Huang | H04W 76/14 |
| 2021/0007096 A1* | 1/2021 | Huang | H04L 5/0055 |
| 2021/0298044 A1* | 9/2021 | Cheng | H04W 72/02 |
| 2022/0039079 A1* | 2/2022 | Yu | H04L 1/1812 |
| 2022/0053462 A1* | 2/2022 | Wang | H04W 72/044 |

FOREIGN PATENT DOCUMENTS

| | | |
|---|---|---|
| CN | 108307438 A | 7/2018 |
| CN | 108616840 A | 10/2018 |
| WO | WO-2021012824 A1 * | 1/2021 |

OTHER PUBLICATIONS

Technologies standards and applications of LTE-V2X for vehicular networks telecommunication Science No. 04, Apr. 20, 2018.

* cited by examiner

METHOD AND DEVICE IN NODES USED FOR WIRELESS COMMUNICATION

CROSS REFERENCE TO RELATED APPLICATIONS

This application is the continuation of International Patent Application No. PCT/CN2020/099411, filed on Jun. 30, 2020, which claims the priority benefit of Chinese Patent Application No. 201910636223.X, filed on Jul. 15, 2019, the full disclosure of which is incorporated herein by reference.

BACKGROUND

Technical Field

The present disclosure relates to transmission methods and devices in wireless communication systems, and in particular to a method and device for timing synchronization in a system with larger transmission delay.

Related Art

In response to rapidly growing Vehicle-to-Everything (V2X) traffics, the 3GPP has embarked on its work of standards setting and studies around the NR framework. At present, the 3GPP has finished regulations of requirements targeting the 5G V2X traffics which are included in the TS 22.886. The 3GPP defined 4 typical Use Case Groups for the 5G V2X traffics, which are as follows: Vehicles Platooning, Extended Sensors, Advanced Driving and Remote Driving. The V2X system now supports time-frequency resources used for V2X transmissions configured by a base station and those determined by a transmitting end in V2X through sensing measurements.

In the meantime, for better adaptability to diverse application scenarios and fulfillment of various requests, the 3GPP RAN #75 Plenary approved a study item of Non-Terrestrial Networks (NTN) under NR, which was started with R15 of Technical Specifications. And later at the 3GPP RAN #79 Plenary, a decision was made on studies of schemes in NTN and a follow-up WI was initiated in R16 or R17 to standardize relevant techniques.

SUMMARY

Thanks to the advantageously wide coverage of NTN, when combining with V2X technology, the NTN can configure time-frequency resources used in V2X transmission for geographical locations still uncovered by a terrestrial base station, to allow for determination of time-frequency resources actually to be transmitted between V2X terminals based on signaling configured by a base station. For a Device to Device (D2D) transmission, as specified in Rel-12, the base station usually configures unified time-domain resources for D2D transmission targeting the whole cell, thus avoiding interference to a Uu interface (corresponding to a cellular link); Since the delay from a user within the coverage of the base station to the base station is relatively small, which is, most of the time, no longer than the time duration of a multicarrier symbol, it is acknowledged that a User Equipment (UE) distant from the base station and one which is nearer are both configured with unified D2D time-domain resources and thus won't leave an impact on the terminal's own Uu interface. But when introducing V2X into the NTN, due to the large differences of Timing Advance (TA) between UEs, sometimes even reaching up to couples or a dozen of milliseconds, if the method in Rel-12 continues to be used, a larger TA difference will potentially cause Uu transmissions to deviate from some UEs and fall into V2X links of other UEs as the base station configures unified V2X time-domain resources, thus resulting in interferences.

There is a simple way of solving the above problem, that is, to configure for different TA users V2X time-domain resources with enough time-domain distances, so as to prevent transmissions on a Uu interface from shifting to a PC-5 interface (corresponding to a sidelink). A defect of the method is that too many resources will be unavailable for scheduling of the Uu interface, and the spectrum efficiency will be reduced. To address the above issue, a solution is herein proposed by the present disclosure. It should be noted that the embodiments of a first node and a third node of the present disclosure and the characteristics in the embodiments may be applied to a base station while the embodiments of a second node can be applied to a terminal if no conflict is incurred. Meanwhile, the embodiments in the present disclosure and the characteristics in the embodiments can be arbitrarily combined if there is no conflict.

The present disclosure provides a method in a first node for wireless communications, comprising:
  receiving a first signaling, the first signaling being used to determine K time-frequency resource pools, K being a positive integer greater than 1; and
  transmitting a first signal in a first time-frequency resource set;
  herein, the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink.

In one embodiment, the principle of the above method lies in that: As transmission delays from different UEs to a base station vary a lot, when the base station configures unified time-domain resources for V2X transmissions, transmissions in Uu interfaces of some UEs are supposed to shift to V2X resources of other UEs; in view of the issue above, the K time offsets are respectively used to indicate numbers of multicarrier symbols by which a data channel shall be delayed when the data channel is actually transmitted in the K time-frequency resource pools; time-domain resources corresponding to the above numbers of multicarrier symbols will be interfered by uplink transmission in Uu interfaces of other UEs.

In one embodiment, an advantage of the above method is that: When configuring V2X transmissions and having a good knowledge of positional information for a UE within coverage, a base station can, through indication of K time offsets in combination with scheduling, configure time-domain resources used for V2X transmission uniformly while avoiding interference of a Uu interface to a PC-5 interface via the indication of the K time offsets, thereby enhancing the spectrum efficiency and getting away from fragmented time-domain resources.

According to one aspect of the present disclosure, the above method is characterized in that the first signaling comprises K sub-signalings, the K sub-signalings are respectively used to determine the K time-frequency resource pools, and the K sub-signalings are respectively used to determine the K time offsets.

In one embodiment, an advantage of the above method is that: The K sub-signalings can configure the K time offsets separately, making it more flexible to indicate those time-domain resources unavailable for V2X transmissions in the K time-frequency resource pools, thus increasing the spectrum efficiency and the scheduling flexibility.

According to one aspect of the present disclosure, the above method is characterized in that any time offset among the K time offsets belongs to a first time offset set, the first time offset set comprising more than one time offset; for a sub-carrier spacing of sub-carriers occupied by the first signal which is given in frequency domain, the time offsets comprised in the first time offset set are fixed.

In one embodiment, an advantage of the above method is that: different sub-carrier spacings correspond to durations of different multicarrier symbols, which in turn correspond to different ranges of values of K time offsets; such design seeks to associate the ranges of values of the K time offsets with sub-carrier spacings, for avoidance of incurring extra signaling overhead in indication of the K time offset values.

According to one aspect of the present disclosure, the above method is characterized in comprising:

transmitting a second signaling in a second time-frequency resource set;

herein, the second signaling comprises a configuration information set for the first signal, the second signaling being a physical layer signaling; the second time-frequency resource set belongs to the first time-frequency resource pool, for a sub-carrier spacing of sub-carriers occupied by the second signaling which is given in frequency domain, length of a time interval between a start time of the second time-frequency resource set in time domain and a start time of the first time-frequency resource pool in time domain is fixed.

According to one aspect of the present disclosure, the above method is characterized in that the first signaling is used to determine a resource mapping mode for the first signal in the first time-frequency resource pool.

According to one aspect of the present disclosure, the above method is characterized in that the K time offsets are related to positional information for the first node.

In one embodiment, an advantage of the above method is that: The position of the first node relative to the base station will affect the severity of interference to the first node from Uu interfaces of other UEs, so, associating the K time offsets with the positional information for the first node is of great benefit to more effective configuration of V2X resources with lower interference.

The present disclosure provides a method in a second node for wireless communications, comprising:

transmitting a first signaling, the first signaling being used to determine K time-frequency resource pools, K being a positive integer greater than 1; and herein, a receiver for the first signaling comprises a first node, and the first node transmits a first signal in a first time-frequency resource set; the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink.

According to one aspect of the present disclosure, the above method is characterized in that the first signaling comprises K sub-signalings, the K sub-signalings are respectively used to determine the K time-frequency resource pools, and the K sub-signalings are respectively used to determine the K time offsets.

According to one aspect of the present disclosure, the above method is characterized in that any time offset among the K time offsets belongs to a first time offset set, the first time offset set comprising more than one time offset; for a sub-carrier spacing of sub-carriers occupied by the first signal which is given in frequency domain, the time offsets comprised in the first time offset set are fixed.

According to one aspect of the present disclosure, the above method is characterized in that the first node transmits a second signaling in a second time-frequency resource set; the second signaling comprises a configuration information set for the first signal, the second signaling being a physical layer signaling; the second time-frequency resource set belongs to the first time-frequency resource pool, for a sub-carrier spacing of sub-carriers occupied by the second signaling which is given in frequency domain, length of a time interval between a start time of the second time-frequency resource set in time domain and a start time of the first time-frequency resource pool in time domain is fixed.

According to one aspect of the present disclosure, the above method is characterized in that the first signaling is used to determine a resource mapping mode for the first signal in the first time-frequency resource pool.

According to one aspect of the present disclosure, the above method is characterized in that the K time offsets are related to positional information for the first node.

The present disclosure provides a method in a third node for wireless communications, comprising:

receiving a first signal in a first time-frequency resource set;

herein, a transmitter for the first signal receives a first signaling, the first signaling being used to determine K time-frequency resource pools, K being a positive integer greater than 1; the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink.

According to one aspect of the present disclosure, the above method is characterized in that the first signaling comprises K sub-signalings, the K sub-signalings are respectively used to determine the K time-frequency resource pools, and the K sub-signalings are respectively used to determine the K time offsets.

According to one aspect of the present disclosure, the above method is characterized in that any time offset among the K time offsets belongs to a first time offset set, the first time offset set comprising more than one time offset; for a sub-carrier spacing of sub-carriers occupied by the first signal which is given in frequency domain, the time offsets comprised in the first time offset set are fixed.

According to one aspect of the present disclosure, the above method is characterized in comprising:

receiving a second signaling in a second time-frequency resource set;

herein, the second signaling comprises a configuration information set for the first signal, the second signaling being a physical layer signaling; the second time-frequency resource set belongs to the first time-frequency resource pool, for a sub-carrier spacing of sub-carriers occupied by the second signaling which is given in frequency domain, length of a time interval between a start time of the second time-frequency resource set in time domain and a start time of the first time-frequency resource pool in time domain is fixed.

According to one aspect of the present disclosure, the above method is characterized in that the first signaling is used to determine a resource mapping mode for the first signal in the first time-frequency resource pool.

According to one aspect of the present disclosure, the above method is characterized in that the K time offsets are related to positional information for a transmitter for the first node.

The present disclosure provides a first node for wireless communications, comprising:

a first receiver, receiving a first signaling, the first signaling being used to determine K time-frequency resource pools, K being a positive integer greater than 1; and a first transmitter, transmitting a first signal in a first time-frequency resource set;

herein, the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink.

The present disclosure provides a second node for wireless communications, comprising:

a second transmitter, transmitting a first signaling, the first signaling being used to determine K time-frequency resource pools, K being a positive integer greater than 1;

herein, a receiver for the first signaling comprises a first node, and the first node transmits a first signal in a first time-frequency resource set; the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink.

The present disclosure provides a third node for wireless communications, comprising:

a second receiver, receiving a first signal in a first time-frequency resource set;

herein, a transmitter for the first signal receives a first signaling, the first signaling being used to determine K time-frequency resource pools, K being a positive integer greater than 1; the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink.

In one embodiment, compared with the prior art, the present disclosure is advantageous in the following aspects:

when a base station configures V2X transmissions and knows the positional information for a UE within its coverage, the base station can, by indicating K time offsets combined with scheduling, configure time-domain resources used for V2X transmission uniformly while avoiding interference of a Uu interface to a PC-5 interface via the indication of the K time offsets, thereby enhancing the spectrum efficiency and avoiding fragmented time-domain resources;

the K sub-signalings can configure the K time offsets independently, adding flexibility to indicating those time-domain resources in the K time-frequency resource pools which are unavailable for V2X transmissions, thus increasing the spectrum efficiency and the scheduling flexibility;

different sub-carrier spacings correspond to durations of different multicarrier symbols, which in turn correspond to different ranges of values of K time offsets; such design can associate the ranges of values of the K time offsets with the sub-carrier spacings, which seems more rational, and thus can be used to prevent extra signaling overhead incurred in indication of the K time offset values;

the position of the first node relative to the base station will affect the degree of interference to the first node from Uu interfaces of other UEs, therefore, associating the K time offsets with the positional information for the first node will contribute to more effective configuration of V2X resources with lower interference.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
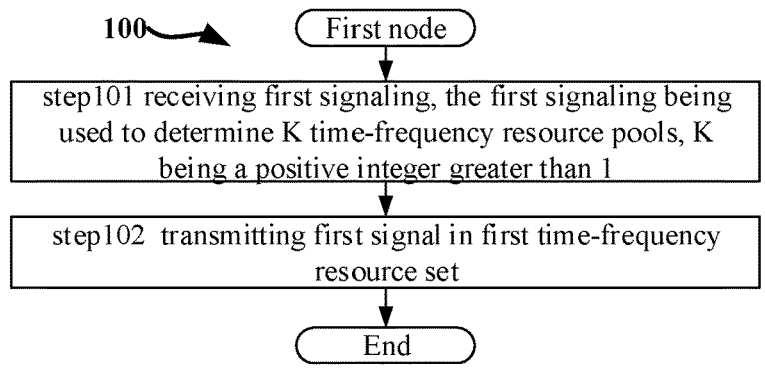
FIG. 1 illustrates a flowchart of processing of a first node according to one embodiment of the present disclosure.

Embodiment 1 illustrates a flowchart of processing of a first node, as shown in FIG. 1. In 100 illustrated by FIG. 1, each box represents a step. In Embodiment 1, the first node in the present disclosure receives a first signaling in step 101, the first signaling being used to determine K time-frequency resource pools, K being a positive integer greater than 1; and transmits a first signal in a first time-frequency resource set in step 102.

In Embodiment 1, the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink.

In one embodiment, the first signaling is a Media Access Control (MAC) Control Element (CE).

In one embodiment, the first signaling is a physical layer dynamic signaling.

In one embodiment, the first signaling is a Radio Resource Control (RRC) signaling.

In one embodiment, the first signaling is UE-specific.

In one embodiment, the first signaling is specific to a terminal group, with the UE belonging to the terminal group.

In one embodiment, the first signaling is Zone-specific, with the UE located in the Zone.

In one subembodiment, a transmitter for the first signaling is an NTN base station, the NTN base station covers multiple Zones, and the UE is in one of the multiple Zones.

In one embodiment, the first signaling is Beam Spot-specific, with the UE located in the Beam Spot; or the first signaling is Beam Area-specific, with the UE located in the Beam Area.

In one subembodiment, a transmitter for the first signaling is an NTN base station; the NTN base station covers multiple beam spots, and the UE is in one of the multiple beam spots; or, the NTN base station covers multiple beam areas, and the UE is in one of the multiple beam areas.

In one embodiment, any one of the K time-frequency resource pools occupies a positive integer number of multicarrier symbol(s) in time domain, and a positive integer number of sub-carrier(s) in frequency domain.

In one embodiment, any one of the K time-frequency resource pools comprises M slot(s).

In one subembodiment, M is equal to 1.

In one subembodiment, M is a positive integer greater than 1.

In one subembodiment, the M slots are contiguous in time domain.

In one embodiment, any one of the K time-frequency resource pools comprises M sub-frame(s).

In one subembodiment, M is equal to 1.

In one subembodiment, M is a positive integer greater than 1.

In one subembodiment, the M sub-frames are contiguous in time domain.

In one embodiment, the first time-frequency resource set occupies a positive integer number of multicarrier symbol(s) in time domain, and a positive integer number of sub-carrier(s) in frequency domain.

In one embodiment, any of the K time offsets is measured in a unit of time length occupied by a multicarrier symbol.

In one embodiment, any of the K time offsets is measured in a unit of microseconds (μs).

In one embodiment, any of the K time offsets is measured in a unit of 1/30720 millisecond (ms).

In one embodiment, any of the K time offsets is measured in a unit of 1/X millisecond, where X is a positive integral multiple of 30720.

In one embodiment, any of the K time offsets is a positive integer number of multicarrier symbol(s).

In one embodiment, there is at least one of the K time offsets being equal to 0.

In one subembodiment, the meaning of the phrase that the K time offsets respectively correspond to the K time-frequency resource pools comprises: a given time offset is any time offset among the K time offsets, and the given time offset corresponds to a given time-frequency resource pool among the K time-frequency resource pools; when the first node transmits a given radio signal in the given time-frequency resource pool, a value of a time offset between a start time of time-domain resources occupied by the given radio signal and a start time of the given time-frequency resource pool in time domain is equal to the given time offset.

In one subsidiary embodiment of the above subembodiment, a physical layer channel occupied by the given radio signal includes a Physical Sidelink Shared Channel (PSSCH).

In one subsidiary embodiment of the above subembodiment, a physical layer channel occupied by the given radio signal includes a Physical Sidelink Feedback Channel (PSFCH).

In one embodiment, the first time offset is equal to 0, a start time of the first time-frequency resource set in time domain is the same as a start time of the first time-frequency resource pool in time domain.

In one embodiment, the first time offset is equal to time duration of N1 multicarrier symbol(s), and the start time of the first time-frequency resource set in time domain is later than the start time of the first time-frequency resource pool in time domain by the N1 multicarrier symbol(s), N1 being a positive integer.

In one embodiment, an end time of the first time-frequency resource set in time domain is the same as an end time of the first time-frequency resource pool in time domain.

In one embodiment, an end time of the first time-frequency resource set in time domain is aligned with a subframe boundary, or an end time of the first time-frequency resource set in time domain is aligned with a slot boundary.

In one embodiment, a physical layer signal occupied by the first signal comprises a PSSCH.

In one embodiment, the first signal is a radio signal.

In one embodiment, the first signal is a baseband signal.

In one embodiment, a transport layer channel occupied by the first signal comprises a Sidelink Shared Channel (SL-SCH).

In one embodiment, the cellular link includes a radio link between the first node and a base station.

In one embodiment, the cellular link includes a radio link between the first node and the second node in the present disclosure.

In one embodiment, the cellular link includes a radio link between a terminal and an auxiliary base station for a serving cell.

In one embodiment, the sidelink includes a PC-5 link.

In one embodiment, the sidelink includes a radio link between the first node and the third node in the present disclosure.

In one embodiment, the sidelink includes a radio link between the first node and a terminal device.

In one embodiment, the sidelink includes a radio link between terminal devices.

In one embodiment, the sidelink includes a radio link between UEs.

In one embodiment, a transmitter for the first signaling is a second node.

In one embodiment, the second node in the present disclosure is a base station in NTN.

In one embodiment, the second node in the present disclosure is a Non-Terrestrial base station.

In one embodiment, the second node in the present disclosure is one of Geostationary Earth Orbiting (GEO) satellite, Medium Earth Orbiting (MEO) satellite, Low Earth Orbit (LEO) satellite, Highly Elliptical Orbiting (HEO) satellite or an Airborne Platform.

In one embodiment, the multicarrier symbol in the present disclosure is an Orthogonal Frequency Division Multiplexing (OFDM) Symbol.

In one embodiment, the multicarrier symbol in the present disclosure is a Single Carrier-Frequency Division Multiple Access (SC-FDMA) symbol.

In one embodiment, the multicarrier symbol in the present disclosure is a Filter Bank Multi Carrier (FBMC) symbol.

In one embodiment, the multicarrier symbol in the present disclosure is an OFDM symbol containing Cyclic Prefix (CP).

In one embodiment, the multicarrier symbol in the present disclosure is a Discrete Fourier Transform Spreading Orthogonal Frequency Division Multiplexing (DFT-s-OFDM) symbol containing CP.

Embodiment 2

Figure 2:
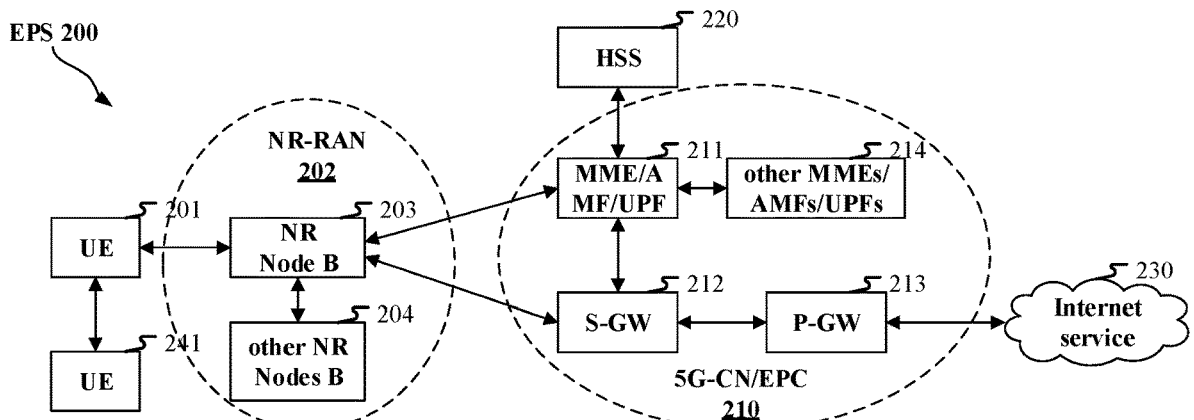
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other suitable terminology. The EPS 200 may comprise one or more UEs 201, a UE 241 in sidelink communication with the UE(s) 201, an NG-RAN 202, a Evolved Packet Core/5G-Core Network (EPC-5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the gNB 203 corresponds to the second node in the present disclosure.

In one embodiment, the UE 241 corresponds to the third node in the present disclosure.

In one embodiment, an air interface between the UE 201 and the gNB 203 is a Uu interface.

In one embodiment, an air interface between the UE 201 and the UE 241 is a PC-5 interface.

In one embodiment, a radio link between the UE 201 and the gNB 203 is a cellular link.

In one embodiment, a radio link between the UE 201 and the UE 241 is a sidelink.

In one embodiment, the first node in the present disclosure is a terminal within the coverage of the gNB 203.

In one embodiment, the third node in the present disclosure is a terminal within the coverage of the gNB 203.

In one embodiment, the UE 201 and the UE 241 belong to a same beam spot.

In one embodiment, the UE 201 and the UE 241 belong to a same beam area.

In one embodiment, the first node and the third node belong to a V2X Pair.

In one embodiment, the first node is an automobile.

In one embodiment, the first node is a vehicle.

In one embodiment, the second node is a base station.

In one embodiment, the third node is a vehicle.

In one embodiment, the third node is an automobile.

In one embodiment, the third node is a Road Side Unit (RSU).

In one embodiment, the third node is a Group Header of a terminal group.

In one embodiment, the first node is an RSU.

In one embodiment, the first node is a Group Header of a terminal group.

Embodiment 3

Figure 3:
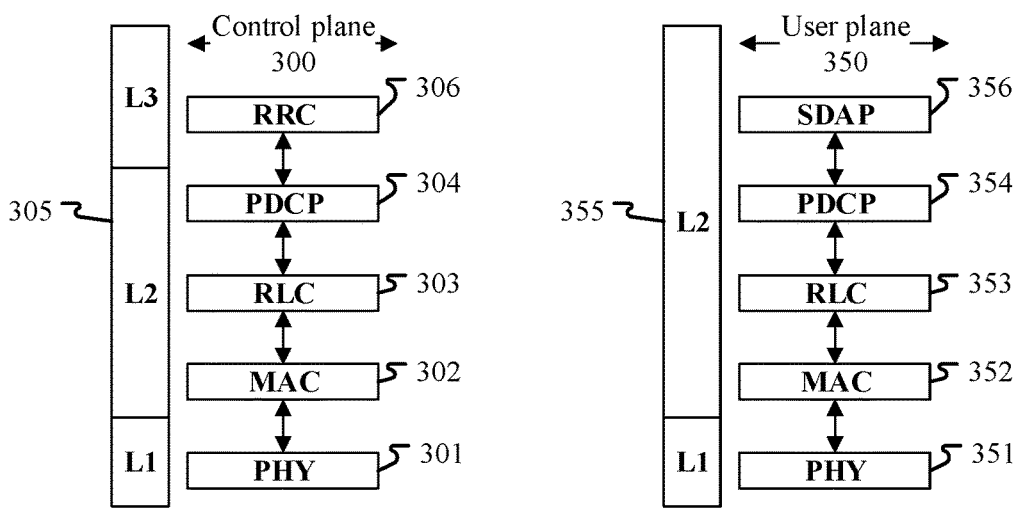
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 1 (L1) is the lowest layer which performs signal processing functions of various PHY layers. The L1 is called PHY 301 in the present disclosure. The layer 2 (L2) 305 is above the PHY 301, and is in charge of the link between a first communication node and a second communication node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets and also support for inter-cell handover of the first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the first signaling is generated by the RRC 306.

In one embodiment, the first signal is generated by the PHY 301, or the PHY 351.

In one embodiment, the first signal is generated by the MAC 352, or the MAC 302.

In one embodiment, the first signal is generated by the RRC 306.

In one embodiment, the second signaling is generated by the PHY 301, or the PHY 351.

Embodiment 4

Figure 4:
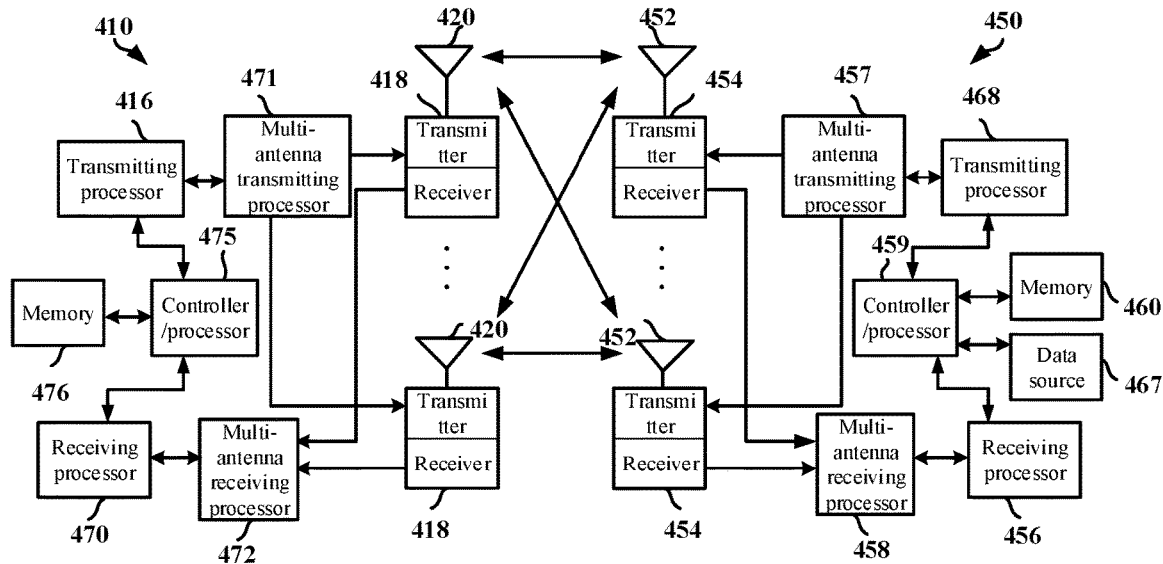
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. at least one processor and at least one memory, the at least one memory comprises computer program codes; the at least one memory and the computer program codes are configured to be used in collaboration with the at least one processor. The first communication device 450 at least: receives a first signaling, the first signaling being used to determine K time-frequency resource pools, K being a positive integer greater than 1; and transmits a first signal in a first time-frequency resource set; the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink.

In one embodiment, the first communication node 450 comprises a memory that stores a computer readable instruction program, the computer readable instruction program generates actions when executed by at least one processor, which include: receiving a first signaling, the first signaling being used to determine K time-frequency resource pools, K being a positive integer greater than 1; and transmitting a first signal in a first time-frequency resource set; the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: transmits a first signaling, the first signaling being used to determine K time-frequency resource pools, K being a positive integer greater than 1; and a receiver for the first signaling comprises a first node, and the first node transmits a first signal in a first time-frequency resource set; the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink.

In one embodiment, the second communication device 410 comprises a memory that stores a computer readable instruction program, the computer readable instruction program generates actions when executed by at least one processor, which include: transmitting a first signaling, the first signaling being used to determine K time-frequency resource pools, K being a positive integer greater than 1; and a receiver for the first signaling comprises a first node, and the first node transmits a first signal in a first time-frequency resource set; the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: receives a first signal in a first time-frequency resource set; a transmitter for the first signal receives a first signaling, the first signaling being used to determine K time-frequency resource pools, K being a positive integer greater than 1; the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink.

In one embodiment, the second communication device 410 comprises a memory that stores a computer readable instruction program, the computer readable instruction program generates actions when executed by at least one processor, which include: receiving a first signal in a first time-frequency resource set; a transmitter for the first signal receives a first signaling, the first signaling being used to determine K time-frequency resource pools, K being a positive integer greater than 1; the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink.

In one embodiment, the first communication device 450 corresponds to the first node in the present disclosure.

In one embodiment, the second communication device 410 corresponds to the second node in the present disclosure.

In one embodiment, the second communication device 410 corresponds to the third node in the present disclosure.

In one embodiment, the first communication device 450 is a UE.

In one embodiment, the second communication device 410 is a base station.

In one embodiment, the second communication device 410 is a UE.

In one embodiment, at least one of the antenna 452, the receiver 454, the multi-antenna receiving processor 458, the receiving processor 456, or the controller/processor 459 is used for receiving a first signaling; at least one of the antenna 420, the transmitter 418, the multi-antenna transmitting processor 471, the transmitting processor 416 or the controller/processor 475 is used for transmitting a first signaling; the first signaling is used to determine K time-frequency resource pools, K being a positive integer greater than 1.

In one embodiment, at least one of the antenna 452, the transmitter 454, the multi-antenna transmitting processor 457, the transmitting processor 468 or the controller/processor 459 is used for transmitting a first signal in a first time-frequency resource set; at least one of the antenna 420, the receiver 418, the multi-antenna receiving processor 472, the receiving processor 470 or the controller/processor 475 is used for receiving a first signal in a first time-frequency resource set.

In one embodiment, at least one of the antenna 452, the transmitter 454, the multi-antenna transmitting processor 457, the transmitting processor 468 or the controller/processor 459 is used for transmitting a second signaling in a second time-frequency resource set; at least one of the antenna 420, the receiver 418, the multi-antenna receiving processor 472, the receiving processor 470 or the controller/processor 475 is used for receiving a second signaling in a second time-frequency resource set.

Embodiment 5

Figure 5:
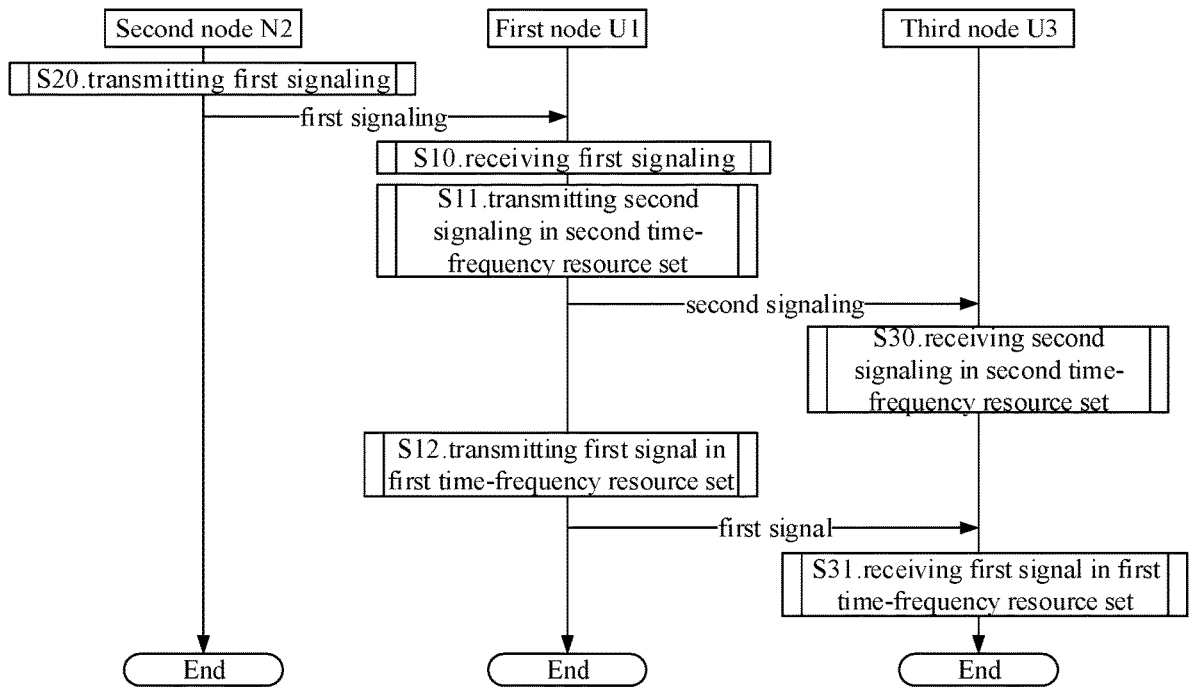
FIG. 5 illustrates a flowchart of a first signaling according to one embodiment of the present disclosure.

Embodiment 5 illustrates a flowchart of a first signaling, as shown in FIG. 5. In FIG. 5, a first node U1 and a second node N2 are in communication via a Uu link, while the first node U1 and a third node U3 are in communication via a sidelink; steps marked by the box FO in this figure are optional.

The first node U1 receives a first signaling in step S10; transmits a second signaling in a second time-frequency resource set in step S11; and transmits a first signal in a first time-frequency resource set in step S12.

The second node N2 transmits a first signaling in step S20.

The third node U3 receives a second signaling in a second time-frequency resource set in step S30; and receives a first signal in a first time-frequency resource set in step S31.

In Embodiment 5, the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink; the second signaling comprises a configuration information set for the first signal, the second signaling being a physical layer signaling; the second time-frequency resource set belongs to the first time-frequency resource pool, for a sub-carrier spacing of sub-carriers occupied by the second signaling which is given in frequency domain, length of a time interval between a start time of the second time-frequency resource set in time domain and a start time of the first time-frequency resource pool in time domain is fixed.

In one embodiment, the first signaling comprises K sub-signalings, the K sub-signalings are respectively used to determine the K time-frequency resource pools, and the K sub-signalings are respectively used to determine the K time offsets.

In one subembodiment, the K sub-signalings are respectively used to determine K frequency-domain resource sets occupied by the K time-frequency resource pools; any one of the K frequency-domain resource sets is comprised of a positive integer number of sub-carrier(s).

In one subembodiment, the K sub-signalings are respectively used to determine K time-domain resource sets occupied by the K time-frequency resource pools; any one of the K time-domain resource sets is comprised of a positive integer number of multicarrier symbol(s).

In one subembodiment, any sub-signaling among the K sub-signalings corresponds to 1 bit, where the bit being equal to "0" denotes that a corresponding time offset is equal to 0, and the bit being equal to "1" denotes that a corresponding time offset is equal to the first time offset.

In one subsidiary embodiment of the above subembodiment, the first time offset is equal to T1 μs, where T1 is a positive real number.

In one subsidiary embodiment of the above subembodiment, the first time offset is equal to Y/X ms, where X is a positive integral multiple of 30720, and Y is a positive integer.

In one subsidiary embodiment of the above subembodiment, the first time offset is equal to T2 multicarrier symbol(s), where T2 is a positive integer.

In one subsidiary embodiment of the above subembodiment, the first time offset is unrelated to the K sub-signalings.

In one subsidiary embodiment of the above subembodiment, the first time offset is configured by a signaling other than the first signaling.

In one subsidiary embodiment of the above subembodiment, the first time offset is related to where the first node U1 is located.

In one subsidiary embodiment of the above subembodiment, the first time offset is related to a distance between the first node U1 and the second node N2.

In one subsidiary embodiment of the above subembodiment, the first time offset is related to an inclination angle between the second node N2 and the first node U1.

In one subembodiment, any of the K sub-signalings corresponds to L bits, the L bits being used to indicate a corresponding time offset out of the K time offsets.

In one subembodiment, a bit size comprised in an information bit set used for generating the first signaling is fixed.

In one subembodiment, a bit size comprised in an information bit set used for generating the first signaling is dependent on the K's value.

In one subembodiment, a bit size comprised in an information bit set used for generating the first signaling is variable.

In one embodiment, any time offset among the K time offsets belongs to a first time offset set, the first time offset set comprising more than one time offset; for a sub-carrier spacing of sub-carriers occupied by the first signal which is given in frequency domain, the time offsets comprised in the first time offset set are fixed.

In one subembodiment, the first time offset set is comprised of Q time offsets, Q being a positive integer greater than 1.

In one subsidiary embodiment of the above subembodiment, a given sub-signaling is any sub-signaling among the K sub-signalings, and a given time offset is a time offset determined by the given sub-signaling among the K time offsets, the given sub-signaling being used to indicate the given time offset out of the Q time offsets.

In one subembodiment, the first time offset set is a first-type candidate time offset set of Q1 first-type candidate time offset sets, the Q1 first-type candidate time offset sets respectively corresponding to Q1 different sub-carrier spacings.

In one subsidiary embodiment of the above subembodiment, any of the Q1 first-type candidate time offset sets is comprised of a positive integer number of time offset(s).

In one subembodiment, the phrase that "for a sub-carrier spacing of sub-carriers occupied by the first signal which is given in frequency domain, the time offsets comprised in the first time offset set are fixed" means that the first time offset set comprises Q time offsets, and the Q time offsets are only related to a sub-carrier spacing of sub-carriers occupied by the first signal in frequency domain.

In one subembodiment, the phrase that "for a sub-carrier spacing of sub-carriers occupied by the first signal which is given in frequency domain, the time offsets comprised in the first time offset set are fixed" means that the first time offset set comprises Q time offsets, as long as the sub-carrier spacing of sub-carriers occupied by the first signal in frequency domain stays unchanged, the Q time offsets are kept the same.

In one embodiment, a physical layer signaling occupied by the second signaling is a Physical Sidelink Control Channel (PSCCH).

In one embodiment, the second signaling is a piece of Sidelink Control Information (SCI).

In one embodiment, the second time-frequency resource set occupies a positive integer number of Resource Elements (REs), and any of the REs occupied by the second time-frequency resource set belongs to the first time-frequency resource pool.

In one embodiment, the phrase that "for a sub-carrier spacing of sub-carriers occupied by the second signaling which is given in frequency domain, length of a time interval between a start time of the second time-frequency resource set in time domain and a start time of the first time-frequency resource pool in time domain is fixed" means that when the sub-carrier spacing of sub-carriers occupied by the second signaling in frequency domain stays unchanged, the length of the time interval between the start time of the second time-frequency resource set in time domain and the start time of the first time-frequency resource pool in time domain is constant.

In one embodiment, the phrase that "length of a time interval between a start time of the second time-frequency resource set in time domain and a start time of the first time-frequency resource pool in time domain is fixed" means that the length of the time interval between the start time of the second time-frequency resource set in time domain and the start time of the first time-frequency resource pool in time domain is equal to 0.

In one embodiment, the phrase that "length of a time interval between a start time of the second time-frequency resource set in time domain and a start time of the first time-frequency resource pool in time domain is fixed" means that the length of the time interval between the start time of the second time-frequency resource set in time domain and the start time of the first time-frequency resource pool in time domain is equal to P1 multicarrier symbol(s), where P1 is a fixed number.

In one embodiment, the phrase that "length of a time interval between a start time of the second time-frequency resource set in time domain and a start time of the first time-frequency resource pool in time domain is fixed" means that the length of the time interval between the start time of the second time-frequency resource set in time domain and the start time of the first time-frequency resource pool in time domain is equal to P1 multicarrier symbol(s), when the sub-carrier spacing of sub-carriers occupied by the second signaling in frequency domain stays unchanged, P1 is invariable.

In one embodiment, the second signaling is used to indicate time-domain resources occupied by the first time-frequency resource set.

In one embodiment, the second signaling is used to indicate frequency-domain resources occupied by the first time-frequency resource set.

In one embodiment, the second signaling is used to indicate an end time for the first time-frequency resource set in time domain.

In one embodiment, the configuration information set for the first signal comprised in the second signaling comprises at least one of frequency-domain resources occupied by the first signal, time-domain resources occupied by the first signal, a Modulation and Coding Status (MCS) adopted by the first signal, a Redundancy Version (RV) corresponding to the first signal, a Hybrid Automatic Repeat Request (HARQ) Process Number corresponding to the first signal, or a New Data Indicator (NDI) for indicating the first signal.

In one embodiment, the first signaling is used to determine a resource mapping mode for the first signal in the first time-frequency resource pool.

In one subembodiment, a first Transport Block (TB) is used to generate the first signal, size of the first TB relating to the resource mapping mode for the first signal in the first time-frequency resource pool.

In one subembodiment, the first signaling is used to indicate the resource mapping mode for the first signal in the first time-frequency resource pool.

In one subembodiment, the first signaling is used to indicate that the resource mapping mode for the first signal in the first time-frequency resource pool is puncturing.

In one subsidiary embodiment of the above subembodiment, the phrase that the resource mapping mode for the first signal in the first time-frequency resource pool is puncturing has the following meaning: a first bit block is used to generate the first signal, and R modulation symbols are generated after the first bit block is through operations including modulation and coding, the R modulation symbols start being mapped at a start time of the first time-frequency resource pool, and among the R modulation symbols at least one modulation symbol located between the start time of the first time-frequency resource pool and a start time of the first time-frequency resource set is to be punctured.

In one subembodiment, the first signaling is used to indicate that the resource mapping mode for the first signal in the first time-frequency resource pool is Rate-matching.

In one subsidiary embodiment of the above subembodiment, the phrase that the resource mapping mode for the first signal in the first time-frequency resource pool is Rate-matching has the following meaning: a first bit block is used to generate the first signal, and R modulation symbols are generated after the first bit block is through operations including modulation and coding, the R modulation symbols start being mapped at a start time of the first time-frequency resource set.

In one embodiment, the K time offsets are related to the positional information for the first node U1.

In one subembodiment, the phrase that the K time offsets are related to the positional information for the first node U1 means that: any of the K time offsets belongs to a second time offset set, the second time offset set being comprised of Q2 time offsets, the Q2 time offsets being related to the positional information for the first node U1.

In one subembodiment, the positional information for the first node U1 comprises a straight-line distance between the first node U1 and the second node N2.

In one subembodiment, the positional information for the first node U1 comprises an inclination angle between the second node N2 and the first node U1.

In one subembodiment, the positional information for the first node U1 comprises transmission delay between the first node U1 and the second node N2.

In one subembodiment, the positional information for the first node U1 comprises a beam spot to which the first node U1 belongs, or a beam area to which the first node U1 belongs.

In one subembodiment, a coverage area of the second node N2 is divided into Q3 areas, Q3 being a positive integer greater than 1, the Q3 areas respectively corresponding to Q3 second-type time offset sets; the first node U1 is in a given area among the Q3 areas, the given area corresponds to a second time offset set among the Q3 second-type time offset sets, the second time offset set being comprised of Q2 time offsets, any time offset among the K time offsets is one of the Q2 time offsets; where Q2 is a positive integer greater than 1.

Embodiment 6

Figure 6:
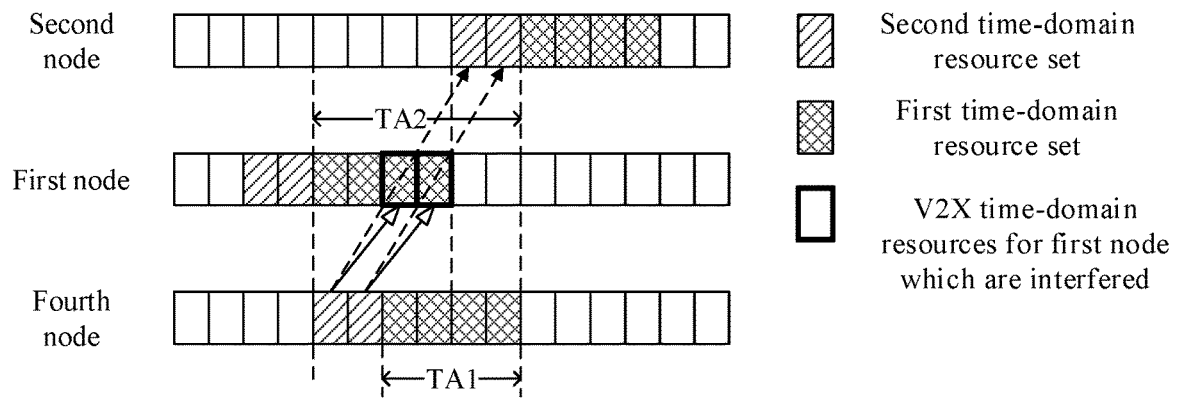
FIG. 6 illustrates a schematic diagram of technical scheme according to one embodiment of the present disclosure.

Embodiment 6 illustrates a schematic diagram of a technical scheme, as shown in FIG. 6. In FIG. 6, a first node and a third node are covered by a third node, and the first node is in V2X communication with the third node; concurrently, a fourth node is covered by the second node, and the fourth node is in cellular-link-based communication with the second node; the second node configures a first time-domain resource set used for V2X transmission identified in FIG. 6 for the first node and the third node, as there is much difference between a transmission delay in the transmission from the first node to the second node and that from the fourth node to the second node, although the second node has configured unified V2X-transmission-targeted first time-domain resource set, a cellular-link transmission sent from the fourth node in the second time-domain resource set is still likely to be shifted to the first time-domain resource set as deemed by the first node; what the scheme provided in the present disclosure aims to solve includes the issue stated in this Embodiment; TA1 in FIG. 6 corresponds to a TA from the first node to the second node, while TA2 corresponds to a TA from the fourth node to the second node.

In one embodiment, the fourth node is a terrestrial terminal device.

In one embodiment, the fourth node is a low-altitude device.

In one embodiment, the fourth node is a device other than the base station.

In one embodiment, the fourth node and the first node belong to different beam spots.

In one embodiment, the fourth node and the first node belong to different beam areas.

In one embodiment, the distance between the fourth node and the first node is no smaller than a product of the light velocity and duration of a multicarrier symbol.

Embodiment 7

Figure 7:
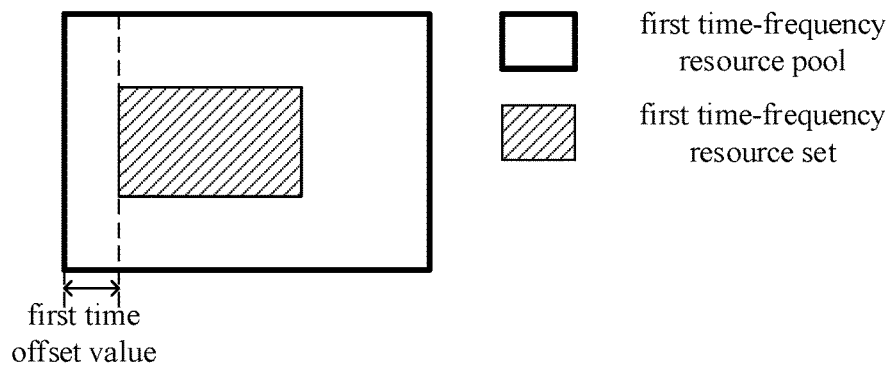
FIG. 7 illustrates a schematic diagram of a first time-frequency resource pool according to one embodiment of the present disclosure.

Embodiment 7 illustrates a schematic diagram of a first time-frequency resource pool, as shown in FIG. 7. In FIG. 7, the first time-frequency resource pool comprises a first time-frequency resource set, the first time-frequency resource set corresponding to a first time offset value, the first time offset is a value of a time offset between a start time of the first time-frequency resource set in time domain and a start time of the first time-frequency resource pool in time domain.

In one embodiment, a data channel in sidelink which is transmitted in the first time-frequency resource pool starts with the first time-frequency resource set.

In one embodiment, a channel other than a data channel in sidelink which is transmitted in the first time-frequency resource pool starts with the first time-frequency resource pool.

Embodiment 8

Figure 8:
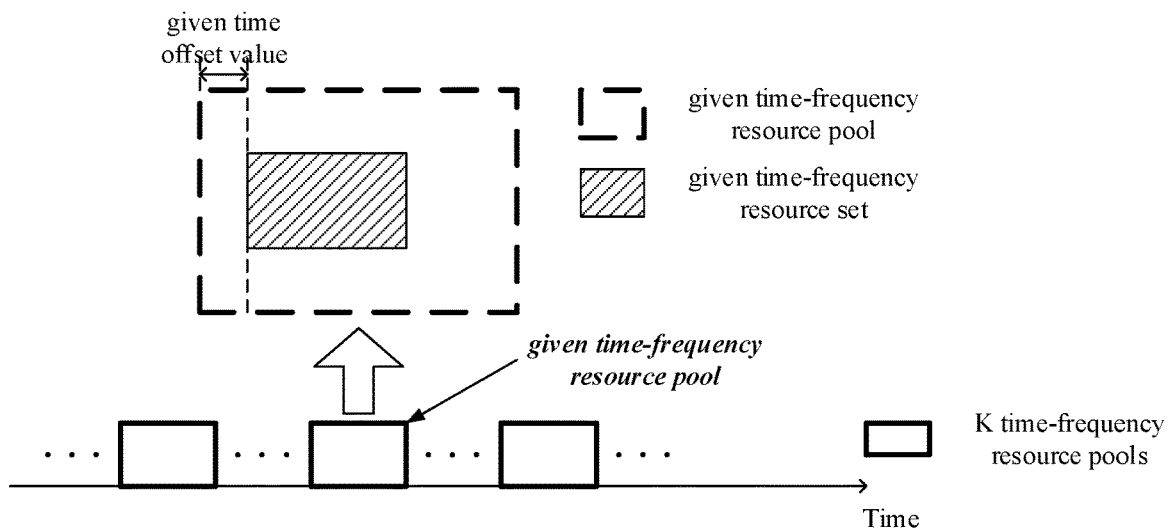
FIG. 8 illustrates a schematic diagram of K time-frequency resource pools according to one embodiment of the present disclosure.

Embodiment 8 illustrates a schematic diagram of K time-frequency resource pools, as shown in FIG. 8. The K time-frequency resource pools illustrated herein are Time Division Multiplexing (TDM) in time domain. A given time-frequency resource pool in FIG. 8 is any time-frequency resource pool among the K time-frequency resource pools, and the given time-frequency resource pool comprises a given time-frequency resource set, a given time offset in the K time offsets corresponds to the given time-frequency resource set, when the first node transmits a given radio signal in the given time-frequency resource pool, the value of a time offset between a start time of time-domain resources occupied by the given radio signal and a start time of the given time-frequency resource pool in time domain is equal to the given time offset.

In one embodiment, there are at least two of the K time offsets having different values.

In one embodiment, any two of the K time offsets which are unequal to 0 have a same value.

In one embodiment, the given radio signal comprises a data channel.

In one embodiment, a physical layer channel occupied by the given radio signal includes a PSFCH.

In one embodiment, a physical layer channel occupied by the given radio signal only includes a PSSCH.

In one embodiment, a physical layer channel occupied by the given radio signal includes a channel other than PSCCH.

Embodiment 9

Figure 9:
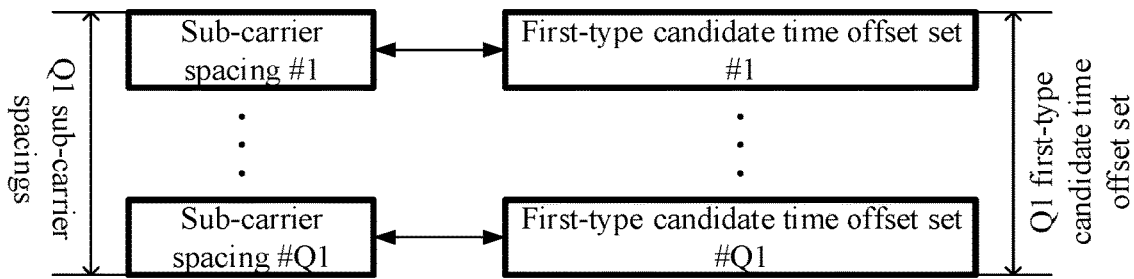
FIG. 9 illustrates a schematic diagram of a first time offset set according to one embodiment of the present disclosure.

Embodiment 9 illustrates a schematic diagram of a first time offset set, as shown in FIG. 9. The first time offset set illustrated herein is a first-type candidate time offset set of Q1 first-type candidate time offset sets, the Q1 first-type candidate time offset sets respectively corresponding to Q1 different sub-carrier spacings; the first time offset set corresponds to a first sub-carrier spacing, when a sub-carrier spacing of sub-carriers occupied by the first signal is equal to the first sub-carrier spacing, the first time offset is a time offset in the first time offset set; Q1 first-type candidate time offset sets illustrated herein range from first-type candidate time offset set #1 to first-type candidate time offset set #Q1, the Q1 different sub-carrier spacings are respectively from sub-carrier spacing #1 to sub-carrier spacing #Q1, which are in one-to-one correspondence relation with the first-type candidate time offset set #1 through the first-type candidate time offset set #Q1.

In one embodiment, the Q1 different sub-carrier spacings include one or more of 15 kHz, 30 kHz, 60 kHz or 120 kHz.

In one embodiment, the Q1 different sub-carrier spacings include one or more of 3.75 kHz, 7.5 kHz or 15 kHz.

In one embodiment, there is at least one time offset not belonging to any two first-type candidate time offset sets among the Q1 first-type candidate time offset sets simultaneously.

Embodiment 10

Figure 10:
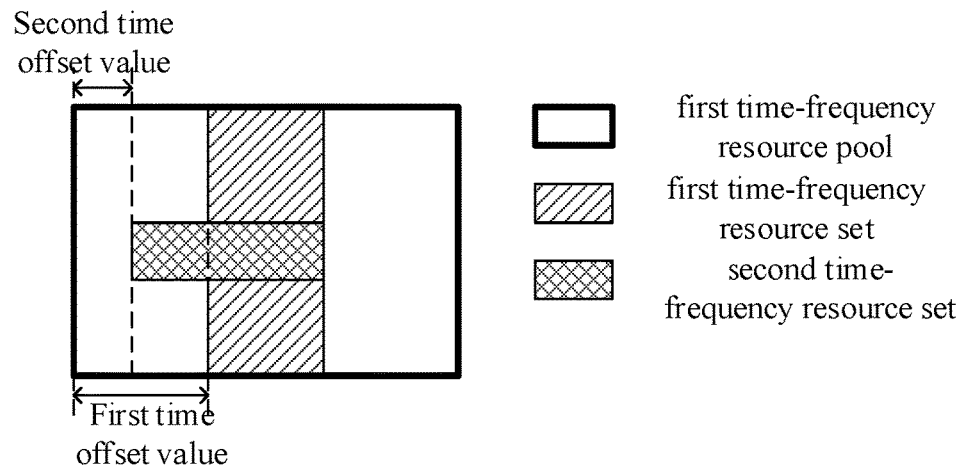
FIG. 10 illustrates a schematic diagram of a second time-frequency resource pool according to one embodiment of the present disclosure.

Embodiment 10 illustrates a schematic diagram of a second time-frequency resource set, as shown in FIG. 10. In FIG. 10, a first time-frequency resource pool comprises a first time-frequency resource set and a second time-frequency resource set; the length of a time interval between a start time of the second time-frequency resource set in time domain and a start time of the first time-frequency resource pool in time domain is a fixed one, equal to a second time offset; the length of a time interval between a start time of the first time-frequency resource set in time domain and a start time of the first time-frequency resource pool in time domain is equal to a first time offset; the second time offset is unequal to the first time offset.

In one embodiment, the first time-frequency resource set and the second time-frequency resource set are orthogonal in time-frequency domain.

In one embodiment, there isn't an RE belonging to the first time-frequency resource set and the second time-frequency resource set.

Embodiment 11

Figure 11:
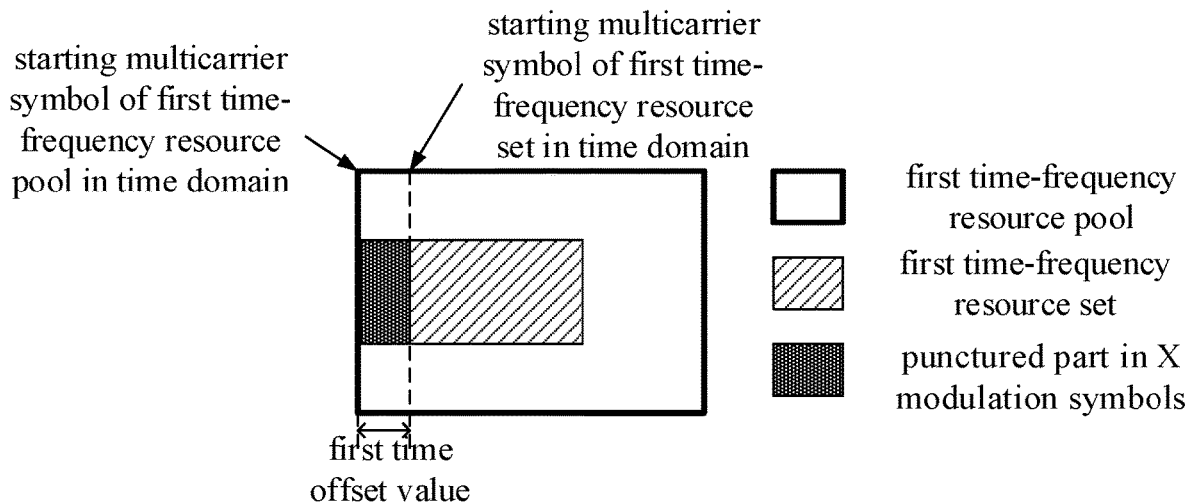
FIG. 11 illustrates a schematic diagram of a resource mapping mode for a first signal in the first time-frequency resource pool according to one embodiment of the present disclosure.

Embodiment 11 illustrates a schematic diagram of a resource mapping mode for a first signal in the first time-frequency resource pool, as shown in FIG. 11. In FIG. 11, the first signal is mapped in the first time-frequency resource pool by means of puncturing.

In one embodiment, a first data block is used to generate the first signal, and the first data block is used to generate X modulation symbols, the X modulation symbols start being mapped from a starting multicarrier symbol in time domain comprised in the first time-frequency resource pool, and are punctured earlier than a modulation symbol for a starting multicarrier symbol in time domain comprised in the first time-frequency resource set.

Embodiment 12

Figure 12:
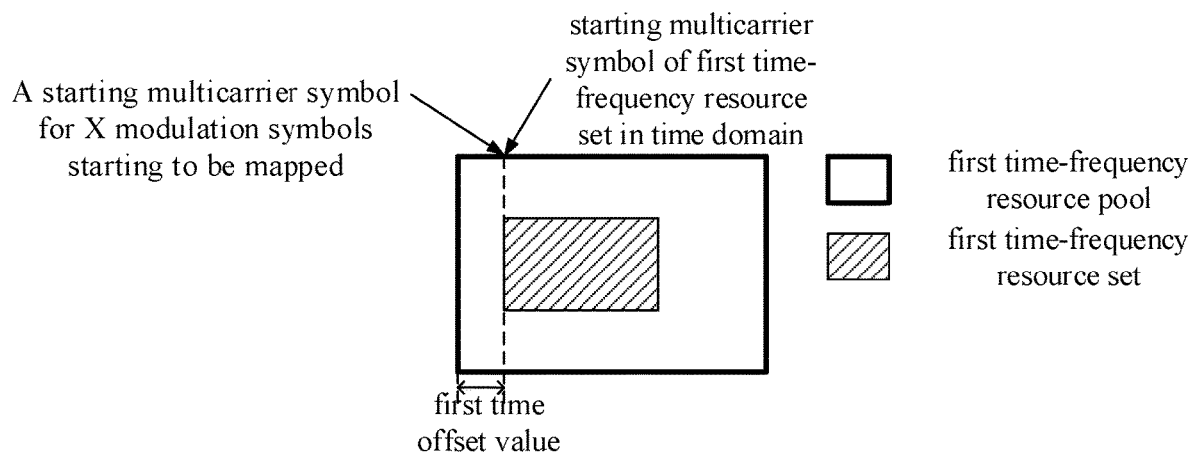
FIG. 12 illustrates a schematic diagram of a resource mapping mode for a first signal in the first time-frequency resource pool according to another embodiment of the present disclosure.

Embodiment 12 illustrates another schematic diagram of a resource mapping mode for a first signal in the first time-frequency resource pool, as shown in FIG. 12. In FIG. 12, the first signal is mapped in the first time-frequency resource pool by means of rate-matching.

In one embodiment, a first data block is used to generate the first signal, and the first data block is used to generate X modulation symbols, the X modulation symbols are mapped in the first time-frequency resource set, starting from a starting multicarrier symbol in time domain comprised in the first time-frequency resource set.

Embodiment 13

Figure 13:
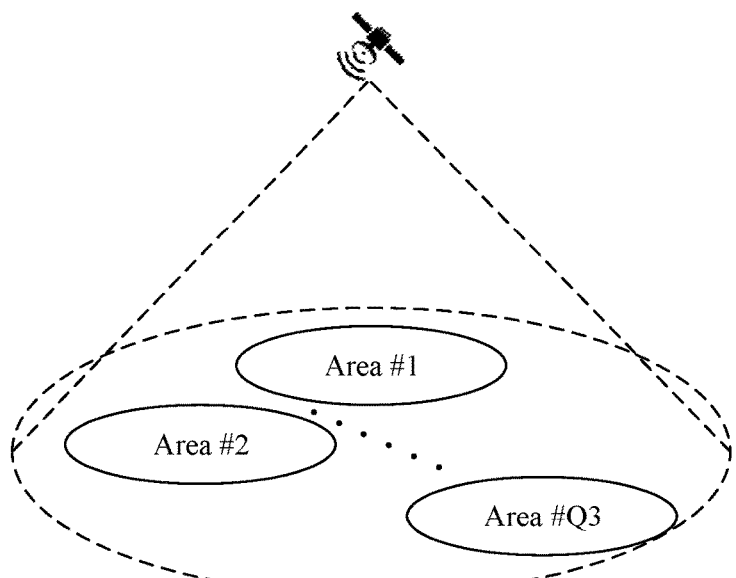
FIG. 13 illustrates a schematic diagram of relationship between the K time offsets and positional information for the first node according to one embodiment of the present disclosure.

Embodiment 13 illustrates a schematic diagram of relationship between the K time offsets and positional information for the first node, as shown in FIG. 13. In FIG. 13, a coverage area of the second node N2 is divided into Q3 areas, Q3 being a positive integer greater than 1, the Q3 areas respectively corresponding to Q3 second-type time offset sets; the first node U1 is in a given area among the Q3 areas, the given area corresponds to a second time offset set among the Q3 second-type time offset sets, the second time offset set being comprised of Q2 time offsets, any time offset among the K time offsets is one of the Q2 time offsets; where Q2 is a positive integer greater than 1. The Q3 areas illustrated in FIG. 13 range from Area #1 to Area #Q3, and the Q3 second-type time offset sets are respectively as follows: second-type time offset set #1 . . . , and second-type time offset set #Q3.

In one embodiment, the Q3 areas respectively correspond to Q3 beam spots.

In one embodiment, the Q3 areas respectively correspond to Q3 beam areas.

In one embodiment, the Q3 areas respectively correspond to Q3 ranges of transmission delays respectively from different terminals to the base station.

Embodiment 14

Figure 14:
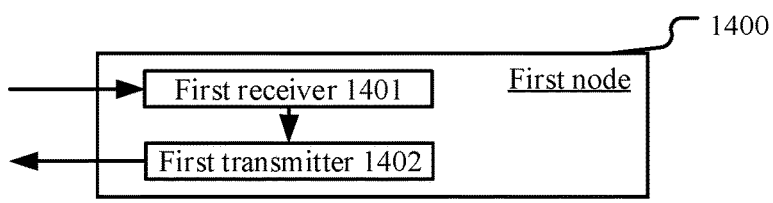
FIG. 14 illustrates a structure block diagram used in a first node according to one embodiment of the present disclosure.

Embodiment 14 illustrates a structure block diagram of a first node, as shown in FIG. 14. In FIG. 14, a first node 1400 comprises a first receiver 1401 and a first transmitter 1402.

The first receiver 1401 receives a first signaling, the first signaling being used to determine K time-frequency resource pools, K being a positive integer greater than 1; and the first transmitter 1402 transmits a first signal in a first time-frequency resource set.

In Embodiment 14, the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink.

In one embodiment, the first signaling comprises K sub-signalings, the K sub-signalings are respectively used to determine the K time-frequency resource pools, and the K sub-signalings are respectively used to determine the K time offsets.

In one embodiment, any time offset among the K time offsets belongs to a first time offset set, the first time offset set comprising more than one time offset; for a sub-carrier spacing of sub-carriers occupied by the first signal which is given in frequency domain, the time offsets comprised in the first time offset set are fixed.

In one embodiment, the first transmitter 1402 transmits a second signaling in a second time-frequency resource set; the second signaling comprises a configuration information set for the first signal, the second signaling being a physical layer signaling; the second time-frequency resource set belongs to the first time-frequency resource pool, for a sub-carrier spacing of sub-carriers occupied by the second signaling which is given in frequency domain, length of a time interval between a start time of the second time-frequency resource set in time domain and a start time of the first time-frequency resource pool in time domain is fixed.

In one embodiment, the first signaling is used to determine a resource mapping mode for the first signal in the first time-frequency resource pool.

In one embodiment, the K time offsets are related to the positional information for the first node.

In one embodiment, the first receiver 1401 comprises at least the first four of the antenna 452, the receiver 454, the multi-antenna receiving processor 458, the receiving processor 456 and the controller/processor 459 in Embodiment 4.

In one embodiment, the first transmitter 1402 comprises at least the first four of the antenna 452, the transmitter 454, the multi-antenna transmitting processor 457, the transmitting processor 468 and the controller/processor 459 in Embodiment 4.

Embodiment 15

Figure 15:
FIG. 15 illustrates a structure block diagram used in a second node according to one embodiment of the present disclosure.

Embodiment 15 illustrates a structure block diagram of a second node, as shown in FIG. 15. In FIG. 15, a second node 1500 comprises a second transmitter 1501.

The second transmitter 1501 transmits a first signaling, the first signaling being used to determine K time-frequency resource pools, K being a positive integer greater than 1.

In Embodiment 15, a receiver for the first signaling comprises a first node, and the first node transmits a first signal in a first time-frequency resource set; the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink.

In one embodiment, the first signaling comprises K sub-signalings, the K sub-signalings are respectively used to determine the K time-frequency resource pools, and the K sub-signalings are respectively used to determine the K time offsets.

In one embodiment, any time offset among the K time offsets belongs to a first time offset set, the first time offset set comprising more than one time offset; for a sub-carrier spacing of sub-carriers occupied by the first signal which is given in frequency domain, the time offsets comprised in the first time offset set are fixed.

In one embodiment, the first signaling is used to determine a resource mapping mode for the first signal in the first time-frequency resource pool.

In one embodiment, the K time offsets are related to the positional information for the first node.

In one embodiment, the second transmitter 1501 comprises at least the first four of the antenna 420, the transmitter 418, the multi-antenna transmitting processor 471, the transmitting processor 416 and the controller/processor 475 in Embodiment 4.

Embodiment 16

Figure 16:
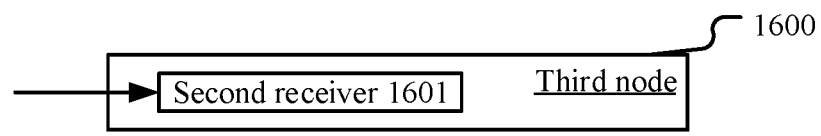
FIG. 16 illustrates a structure block diagram used in a third node according to one embodiment of the present disclosure.

Embodiment 16 illustrates a structure block diagram of a third node, as shown in FIG. 16. In FIG. 16, a third node 1600 comprises a second receiver 1601.

The second receiver 1601 receives a first signal in a first time-frequency resource set.

In Embodiment 16, a transmitter for the first signal receives a first signaling, the first signaling being used to determine K time-frequency resource pools, K being a positive integer greater than 1; the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink.

In one embodiment, the first signaling comprises K sub-signalings, the K sub-signalings are respectively used to determine the K time-frequency resource pools, and the K sub-signalings are respectively used to determine the K time offsets.

In one embodiment, any time offset among the K time offsets belongs to a first time offset set, the first time offset set comprising more than one time offset; for a sub-carrier spacing of sub-carriers occupied by the first signal which is given in frequency domain, the time offsets comprised in the first time offset set are fixed.

In one embodiment, the second receiver 1601 receives a second signaling in a second time-frequency resource set; the second signaling comprises a configuration information set for the first signal, the second signaling being a physical layer signaling; the second time-frequency resource set belongs to the first time-frequency resource pool, for a sub-carrier spacing of sub-carriers occupied by the second signaling which is given in frequency domain, length of a time interval between a start time of the second time-frequency resource set in time domain and a start time of the first time-frequency resource pool in time domain is fixed.

In one embodiment, the first signaling is used to determine a resource mapping mode for the first signal in the first time-frequency resource pool.

In one embodiment, the K time offsets are related to the positional information for the first node.

In one embodiment, the second receiver 1601 comprises at least the first four of the antenna 420, the transmitter 418, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node and the second node in the present disclosure include but are not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, RSU, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, characterized in comprising:
   a first receiver, receiving a first signaling, the first signaling being used to determine K time-frequency resource pools, K being a positive integer greater than 1; and
   a first transmitter, transmitting a first signal in a first time-frequency resource set;
   wherein the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink; the K time offsets are related to positional information for the first node.

2. The first node according to claim 1, wherein the first signaling comprises K sub-signalings, the K sub-signalings are respectively used to determine the K time-frequency resource pools, and the K sub-signalings are respectively used to determine the K time offsets.

3. The first node according to claim 1, wherein any time offset among the K time offsets belongs to a first time offset set, the first time offset set comprising more than one time offset; for a sub-carrier spacing of sub-carriers occupied by the first signal which is given in frequency domain, the time offsets comprised in the first time offset set are fixed.

4. The first node according to claim 1, wherein the first transmitter transmits a second signaling in a second time-frequency resource set; the second signaling comprises a configuration information set for the first signal, the second signaling being a physical layer signaling; the second time-frequency resource set belongs to the first time-frequency resource pool, for a sub-carrier spacing of sub-carriers occupied by the second signaling which is given in frequency domain, length of a time interval between a start time of the second time-frequency resource set in time domain and a start time of the first time-frequency resource pool in time domain is fixed.

5. The first node according to claim 1, wherein the first signaling is used to determine a resource mapping mode for the first signal in the first time-frequency resource pool.

6. The first node according to claim 1, wherein the first signaling is Zone-specific, and the first node is in the Zone.

7. The first node according to claim 1, wherein the first signaling is Beam Spot-specific, and the first node is in the Beam Spot; or the first signaling is Beam Area-specific, and the first node is in the Beam Area.

8. The first node according to claim 1, wherein meaning of the phrase that the K time offsets respectively correspond to the K time-frequency resource pools includes: a given time offset is any time offset among the K time offsets, and the given time offset corresponds to a given time-frequency resource pool among the K time-frequency resource pools; when the first node transmits a given radio signal in the given time-frequency resource pool, a value of a time offset between a start time of time-domain resources occupied by the given radio signal and a start time of the given time-frequency resource pool in time domain is equal to the given time offset.

9. The first node according to claim 1, wherein the first signaling comprises K sub-signalings, the K sub-signalings are respectively used to determine the K time-frequency resource pools, and the K sub-signalings are respectively used to determine the K time offsets; any of the K sub-signalings corresponds to 1 bit, where the bit being equal to "0" denotes that a corresponding time offset is equal to 0, and the bit being equal to "1" denotes that a corresponding time offset is equal to the first time offset.

10. The first node according to claim 1, wherein the first signaling is used to indicate that the resource mapping mode for the first signal in the first time-frequency resource pool is to Puncture; a first bit block is used to generate the first signal, and R modulation symbols are generated after the first bit block is through operations including modulation and coding, the R modulation symbols start being mapped at a start time of the first time-frequency resource pool, and among the R modulation symbols at least one modulation symbol located between the start time of the first time-frequency resource pool and a start time of the first time-frequency resource set is to be punctured.

11. The first node according to claim 1, wherein the first signaling is used to indicate that the resource mapping mode for the first signal in the first time-frequency resource pool is rate matching; a first bit block is used to generate the first signal, and R modulation symbols are generated after the first bit block is through operations including modulation and coding, the R modulation symbols start being mapped at a start time of the first time-frequency resource set.

12. The first node according to claim 1, wherein the positional information for the first node comprises a straight-line distance between the first node and a transmitter for the first signaling.

13. The first node according to claim 1, wherein the positional information for the first node comprises an inclination angle between a transmitter for the first signaling and the first node.

14. The first node according to claim 1, wherein the positional information for the first node comprises transmission delay between the first node and the transmitter for the first signaling.

15. The first node according to claim 1, wherein the positional information for the first node comprises a beam spot to which the first node belongs, or a beam area to which the first node belongs.

16. The first node according to claim 1, wherein the first time offset is equal to time duration of N1 multicarrier symbol(s), and the start time of the first time-frequency resource set in time domain is later than the start time of the first time-frequency resource pool in time domain by the N1 multicarrier symbol(s), N1 being a positive integer.

17. The first node according to claim 1, wherein an end time of the first time-frequency resource set in time domain is aligned with a subframe boundary, or an end time of the first time-frequency resource set in time domain is aligned with a slot boundary.

18. A second node for wireless communications, characterized in comprising:
a second transmitter, transmitting a first signaling, the first signaling being used to determine K time-frequency resource pools, K being a positive integer greater than 1;
wherein a receiver for the first signaling comprises a first node, and the first node transmits a first signal in a first time-frequency resource set; the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink; the K time offsets are related to positional information for the first node.

19. A method in a first node for wireless communications, characterized in comprising:
receiving a first signaling, the first signaling being used to determine K time-frequency resource pools, K being a positive integer greater than 1; and
transmitting a first signal in a first time-frequency resource set;
wherein the first time-frequency resource set belongs to a first time-frequency resource pool, the first time-frequency resource pool being one of the K time-frequency resource pools; K time offsets respectively correspond to the K time-frequency resource pools, and the first signaling is used to determine a time offset corresponding to each time-frequency resource pool among the K time-frequency resource pools; a first time offset is one of the K time offsets that corresponds to the first time-frequency resource pool, and the first time offset is a value of a time offset between a start time of the first time-frequency resource set in time domain and a start time of the first time-frequency resource pool in time domain; the first signaling is transmitted in a cellular link, while the first signal is transmitted in a sidelink; the K time offsets are related to positional information for the first node.

\* \* \* \* \*